United States Patent [19]

Cawthra et al.

[11] 4,185,718

[45] Jan. 29, 1980

[54] METHOD OF JOINTING TEXTILE BELTING OR WEBBING

[75] Inventors: Christopher Cawthra, Bradford; Richard K. Brooke, Cleckheaton, both of England

[73] Assignee: BBA Group Limited, Cleckheaton, England

[21] Appl. No.: 934,713

[22] Filed: Aug. 21, 1978

Related U.S. Application Data

[63] Continuation-in-part of Ser. No. 773,204, Mar. 1, 1977, abandoned.

[30] Foreign Application Priority Data

Mar. 4, 1976 [GB] United Kingdom ................. 8690/76

[51] Int. Cl.$^2$ .............................................. C09J 5/00
[52] U.S. Cl. .................................. 156/258; 156/304; 156/331
[58] Field of Search ............... 156/250, 258, 304, 157, 156/159, 327, 331

[56] References Cited

U.S. PATENT DOCUMENTS 3,755,261  8/1973  Van Gulick ...................... 528/28

FOREIGN PATENT DOCUMENTS 705303   3/1954  United Kingdom .
901197   7/1962  United Kingdom .
1079136  8/1967  United Kingdom .

*Primary Examiner*—John T. Goolkasian
*Assistant Examiner*—William H. Thrower
*Attorney, Agent, or Firm*—McCormick, Paulding & Huber

[57] ABSTRACT

A method of jointing textile belting or webbing using a polyurethane compound, the method comprising coating two ends of the belting or webbing to be joined with a castable liquid mixture that is heat curable to give the polyurethane compound and comprising at least one component that is chemically blocked to substantially eliminate the curing reaction at ambient temperature, and heat curing the mixture on the ends when the ends are in face-to-face relationship. The liquid castable mixture preferably comprises a polyurethane prepolymer and a methylene dianiline sodium chloride complex.

6 Claims, No Drawings

METHOD OF JOINTING TEXTILE BELTING OR WEBBING

This application is a continuation-in-part of U.S. Patent application Ser. No. 773,204 filed Mar. 1, 1977, now abandoned, and entitled "Method of jointing textile belting or webbing."

The present invention relates to an improved method of jointing textile belting or webbing such as is manufactured by a weaving or other process from yarns of cotton or other fibres, such as hair, flax, rayon, or synthetic fibres such as nylon or polyester, or combinations of two or more of these types of fibres.

The invention is particularly useful for joining belting and webbing made of multiple fabric such as that used in conveyor and transmission belting, which has been woven in such a way that it cannot be separated into plies.

Heretofore, several methods have been proposed for jointing textile belting and webbing, but in each case the resultant joint, or the method by which it was obtained, has inherent disadvantages. For example, it has been proposed to join the textile belting or webbing by using metal fasteners but it was found that the tensile strength of the joint was far below that of the remainder of the belt or webbing, that is, not usually more than 50% of the "specified tensile strength" of the belt material. The specified tensile strength of the belt is a figure that is found by measuring the tensile strength of a one inch width of the belt and multiplying it by the width (in inches) of the belt. Thus, a predetermined "specified tensile strength" may be obtained by using a belt of particular tensile strength per inch width and particular width, or by using a belt having a greater tensile strength per inch width and a smaller width.

The normal tensile loading of textile belting or webbing is usually only 10% of the specified tensile strength, but shock loads can increase this drastically and thereby break the metal fasteners. A stronger belt joint was provided by stitching the ends together but this tended to make the belt joint too stiff.

An early improvement was proposed in U.K. Pat. Specification No. 705,303 in the name of the assignees, which was to provide the respective ends of the belting or webbing with a complementary array of V-shaped notches extending across the full width of the belting or webbing, to fit the two ends together leaving a small gap between the edges of the complementary notches, and then to fill the gap with a suitable polyvinyl compound, and cure the compound at 160° C. for a few minutes.

A further improved joint was proposed in the assignees' U.K. Pat. Specification No. 901,197 in which the polyvinyl compound was replaced by a liquid castable polyurethane compound. Such a joint has a longer life than one of polyvinyl, but disadvantages are that the polyurethane compound disclosed therein is sensitive to moisture so that the ends of the belting have to be dried before joining.

Thus, using this system, if the ends of the belt have a moisture content of 5%, the joint will have a tensile strength in the order of only 80% of the specified tensile strength. This figure is usually satisfactory in practice, but when the joint is made with the ends of the belt having a moisture content of between 5% and 6% the tensile strength of the joint begins to drop off very sharply and at 15% moisture content the strength of the joint may be only 10% of the specified tensile strength. Moisture content is determined in a standard way when testing, by weighing the belt as received, then heating the belt for three hours in an oven at 110° C. and reweighing the belt. The moisture content is taken to be the percentage difference in weight.

Further disadvantages of the said polyurethane compound are that it had to be mixed immediately prior to use because of the relatively short reaction time, and that its optimum physical properties are obtained by curing at a temperature of 100° C. over an extended period of three hours.

In some applications the long cure period required by the method described immediately above, and the necessity of having to dry the ends of the webbing or belting to avoid obtaining a foamed polyurethane joint (of much weaker tensile strength) may be inconvenient, particularly in the case of joining a textile belt in situ, for example, in a mine, where the total time taken to dry the belt ends to a maximum of 5% moisture content, to prepare the ends for joining by notching, to prepare and cast the polyurethane compound and to cure the polymer, may be twelve hours. These potential difficulties were alleviated (assuming the belting was not saturated or nearly saturated in water) by using a method of jointing the webbing described in the assignees' Patent Specification No. 1,079,136, in which the edges of the V-shaped notches were lined with a solid fusible polyurethane, after which the ends of the belting were pushed together and heated under pressure to fuse the joint. The textile belting herein referred to is often used below ground in mines and it is clearly of some disadvantage to have to provide means for compressing the joint, at the same time as it is heated, in the mines.

From the above it may be seen that there are several problems associated with the use of polyurethane in joining textile belting; namely, the time taken from beginning to end in joining the belt ends, the risk of foaming and the necessity on occasion (and always with some systems) to use pressure. The time taken to prepare the belting by notching will be the same no matter what system is used, but the remaining time may be divided into two parts, that taken to dry the belt ends sufficiently to avoid excessive foaming as previously discussed, and that taken to cure the jointing material. The problem of extended cure time is associated with the necessity to avoid using curing agent which is excessively reactive, in order to allow sufficient time before the compound sets (working life) after mixing to permit the compound to be applied to the belt ends. It is known that a longer working life usually means a longer cure time to give optimum physical properties so that curing has usually taken place in the past over a period of three hours at 100° C.

It is an object of the present invention to provide a method of jointing textile belting or webbing in which the overall jointing time is substantially reduced.

It is a further object to provide such a method in which the use of pressure is not an essential feature of the curing operation.

It is a yet further object to provide such a method in which the working life of the jointing compound is relatively long but in which the curing time is relatively short.

It is a still further object to provide such a method in which the necessity to dry the belt ends to a maximum 5% moisture content (by weight) is avoided or at least alleviated.

A process for curing (inter alia) polyurethanes is described in the U.S. Patent Specification No. 3,755,261 to VanGulick (the disclosure of which is by reference included herein) in which a curing agent is described which provides a polyurethane system having a very long working life and a very short cure time at elevated temperature, and this system therefore has many of the advantages required.

However, the elevated cure temperatures of the Van-Gulick system may be up to 150° C. or more and it is known, for example, from "The Development and Use of Polyurethane Products" page 14, by E. N. Doyle, that isocyanates in any polyurethane system have a preferable reaction to moisture/water before reaction with amines, and that, from basic chemical kinetics, the rate of chemical reaction increases with increasing temperature. Consequently, whereas the VanGulick system may offer a long working life and shorter cure time for making joints, the higher elevated cure temperature would be considered at first sight to make a reaction with moisture more probable so that in the present case the ends of the belting to be joined would be dried for even longer periods than are previously known to remove every trace of water. This of course would detract from the objects of the present invention and could, apart from causing carbon dioxide to be given off if moisture is present, to give a porous inferior product, cause gassing.

Thus, the VanGulick system is not an obvious choice in the jointing of damp or wet belt ends, but, by selection in the search for a jointing system which provided the aforementioned objects, it was tried and surprisingly a good quality joint was achieved.

Therefore, according to the present invention, there is provided a method of jointing textile belting or webbing having a moisture content of at least 5% by weight with a polyurethane compound, which method comprises:

forming in the two ends of the belting or webbing to be joined a complementary array of V-shaped notches that extends across the full width of said ends;

fitting the complementary notched ends together so as to leave a small gap between the ends of the belt;

before or after said fitting together procedure, applying a sufficient amount of a liquid castable mixture at substantially ambient temperature to fill said gap when the ends are fitted together, the liquid castable mixture being heat curable to provide the polyurethane compound and comprising a polyisocyanate or a polyurethane prepolymer comprising a reaction product of a polyisocyanate, and a polyactive hydrogen containing compound in which active hydrogen groups are chemically blocked at ambient temperature;

and heat curing the mixture in the gap at a comparatively high temperature above ambient that is at or above a temperature at which said polyactive hydrogen containing compound becomes unblocked, to join the notched ends.

It is not fully understood why the system of the present invention gives a good quality joint between moist belt ends but it is believed that the reason may be because, since the drying and curing of the liquid castable mixture is carried out at the relatively high temperature of between 120° C. and 160° C., any water vapour or carbon dioxide gas cannot escape to form bubbles or voids (gassing) as the curing reaction becomes so rapid under these conditions that the curing mass becomes highly viscous in the early stages of cure, and completely solid within 15 to 30 minutes.

The use of the polyurethane compound in accordance with the present invention, which when applied to the belting or webbing at substantially ambient temperature, is a substantially unreactive mixture of the components necessary to make the compound, provides the considerable advantage that the mixture may be made up at a lower temperature than the cure temperature and stored for long periods at the lower temperature without curing, prior to use. This is particularly convenient where the joint has to be made up in situ, for example on belting or webbing on machinery at a relatively inaccessible location. Furthermore, because there is no significant reaction in the mixture to form the polyurethane compound at ambient temperature, the adhesive should be of a consistent viscosity which does not change throughout the assembly of the joint until curing is initiated.

The liquid castable mixture may comprise a mixture of one or more polyisocyanates with one or more polyactive hydrogen containing compounds and the or each polyisocyanate may be of a simple structure such as 2,4 tolylene diisocyanate, m-phenylene diisocyanate, 1,5 naphthalene diisocyanate, or triphenyl methane triisocyanate. Alternatively, the polyisocyanate may be in the form of a compound of higher molecular weight containing free isocyanate groups such as the reaction product of a polytetramethylene glycol reacted with 2,4 tolylene diisocyanate in a molecular ratio of 1:2 (such a higher molecular weight compound being generally known in the art, and hereinafter referred to as, a polyurethane prepolymer).

The term "active hydrogen" refers to hydrogen atoms which display activity according to the Zerewitinoff test as described by Kohler in the Journal of the American Chemical Society 49, 3181 (1927). These hydrogen atoms react with isocyanate groupings allowing polymer chain formation or crosslinking points. Chemical blocking of the active hydrogen atoms prevents this reaction until the reactivity of the active hydrogen atoms is returned by removal of the chemical blocking by heating. The preferred example of a polyactive hydrogen containing compound which is chemically blocked to deactivate active hydrogen at relatively low temperatures, is a methylene dianiline complex with sodium chloride, which has a high order of reactivity when unblocked to ensure a fast cure.

Such a complex, together with others that may be suitable, is described in detail in the VanGulick Specification No. 3,755,261 and is supplied by E. I. De Pont de Nemours and Company.

The minimum temperature required to cure the polyurethane joint formed by the method of the present invention is believed to be 120° C. over a period of 30 minutes to provide a good joint, and this may be increased to a temperature in the order of 160° C. in which case the curing time is reduced to 15 minutes. The cure time may be extended without damaging the joint.

The length of each notch (in the longitudinal direction of the belting or webbing) should be considerably greater than the width to achieve optimum results. The length and width of the notches may be varied, but the ratio of notch length to notch width should conveniently be within the range 2:1 to 30:1 inclusive, and preferably 2:1 to 20:1. It will be understood that the term "V-shaped notches" as used herein is intended to include modifications to the notches as by rounding or squaring the peaks, provided that the joint faces or edges between the notches are of substantial length in relation to their width and extend in the general direction of the length of the belting or webbing. Improved jointing may be obtained by slight roughening of the V-shaped notches with a suitable instrument, before the complementary notched ends are fitted together.

The castable liquid mixture may be applied to the complementary notched ends of the belting before the ends are engaged, and then cured, but preferably the two uncoated ends of the belting or webbing should be brought together so that there is a small gap remaining between the complementary notches. This gap may be filled with the liquid castable mixture which is then heat cured to give the polyurethane compound.

In a preferred embodiment of the invention, the liquid castable mixture comprises a methylene dianiline sodium chloride complex dispersed in an equal weight of dioctyl phthalate, together with a polyurethane prepolymer formed by reacting polytetramethylene ether glycol with a molar excess of tolylene diisocyanate to give a reactive isocyanate content of 5.3% to 5.7% by weight, which when applied to the notched ends of the belting may be cured by heating for approximately 15 minutes at about 150° C. to give an elastomeric polyurethane compound of durometer hardness in the order of Shore "A" 90°.

It will be recalled that using the system described in the assignees' U.K. Pat. Specification No. 901,197, a belt having a moisture content of 5% will have a joint strength in the order of 80% of the specified tensile strength, and that it is known that a higher moisture content will invariably lead to a very much lower joint strength, so that drying is necessary to reduce the moisture content. Recently, a 6" wide textile belt was prepared for joining in the normal manner by shaving off the PVC coating on the belt in the vicinity of the belt ends to reveal the textile carcass, and cutting 30 ins. long complementary notches across the width of the carcass at the belt ends. By way of a test, the notched belt ends were then immersed in a tank of water for six days to give them a moisture content that was determined to be 22%. The belt ends were then removed from the tank and the notches were aligned to leave a small gap in preparation for the preferred jointing method of the present invention as described in the immediately preceding paragraph. Subsequent to curing the tensile strength of the joint was tested and was found to be 91% of the specified tensile strength of the belt. Thus drying of the belt ends is not essential with the method of the present invention.

In order to ensure a good surface finish of the joint a thin layer of a castable liquid mixture that cures to give a polyurethane and which may be the same mixture as that which comprises the jointing compound, may be applied, as by painting, on to the top and bottom surfaces of the area of the belting to be joined before heating takes place, and cured by heating. A layer of open mesh fabric or scrim cloth may also be placed over the top and bottom surfaces of the area being joined to provide additional reinforcement. The reinforcement may be retained on the belting by casting liquid castable mixture over it and heat curing. The scrim cloth is preferably made from a synthetic yarn such as nylon.

The method of the present invention preferably comprises placing the notched ends of the belting or webbing in a suitable support so that the notched ends and any liquid castable mixture between them is supported by a flat sheet. The sheet may be painted with a liquid castable mixture of which at least one component is chemically blocked and which cures on heating to give a polyurethane compound, prior to placing the ends upon it to ensure an even continuous surface on the finished joint. If the liquid castable mixture is applied to a gap between the notched ends, the gap should preferably be approximately ⅛". With the liquid castable mixture located between the inter-engaged notched ends the whole joint is then covered by a further flat sheet which may also be coated as above. A suitable release agent must be used on the two flat sheets, such as, for example a silicon release agent for metal sheets. If required, the scrim cloth may be added by locating it between the surface of the belting and the respective flat sheet.

The joint is then cured by the application of heat, which releases the active hydrogen containing compound from its chemical blocking agent, for example by placing the whole in an oven, or, if not convenient, by placing the joint between the heated platens of a press or similar machine, and, if desired, applying a slight pressure to the joint.

Prior to its application to the joint, various additives may be included in the liquid castable mixture in varying proportions. Such additives may comprise fillers, pigments, flame retardants, plasticisers and/or stabilisers, and may be added singly or in suitable combination. An example of when flame retardants may be used is to ensure that the polyurethane compound formed by the method of the present invention is suitable for use, for example, to join a conveyor belt in a coal-mine.

While preferred materials for the practice of the method of the present invention have been described in detail, those skilled in this art will recognise various alternative materials for practising the method defined by the following claims.

What is claimed is:

1. A method of jointing textile belting or webbing having a moisture content of at least 5% by weight with a polyurethane compound, which method comprises:

forming in the two ends of the belting or webbing to be joined a complementary array of V-shaped notches that extends across the full width of said ends;

fitting the complementary notched ends together so as to leave a small gap between the ends of the belt;

before or after said fitting together procedure, applying a sufficient amount of a liquid castable mixture at substantially ambient temperature to fill said gap when the ends are fitted together, the liquid castable mixture being heat curable to provide the polyurethane compound and comprising a polyisocyanate or a polyurethane prepolymer comprising a reaction product of a polyisocyanate, and a polyactive hydrogen containing compound in which active hydrogen groups are chemically blocked at ambient temperature;

and heat curing the mixture in the gap at a comparatively high temperature above ambient that is at or above a temperature at which said polyactive hydrogen containing compound becomes unblocked, to join the notched ends.

2. A method of jointing textile belting or webbing having a moisture content of at least 5% by weight according to claim 1 in which the liquid castable mixture is coated on the notched ends before they are fitted together.

3. A method of jointing textile belting or webbing having a moisture content of at least 5% by weight according to claim 1 in which the polyisocyanate is selected from the group of 2,4 tolylene diisocyanate, m-phenylene diisocyanate, 1,5 naphthalene diisocyanate, or triphenyl methane triisocyanate.

4. A method of jointing textile belting or webbing having a moisture content of at least 5% by weight according to claim 1 in which the polyactive hydrogen containing compound comprises a complex of methylene dianiline and sodium chloride.

5. A method of jointing textile belting or webbing having a moisture content of at least 5% by weight according to claim 1 in which the liquid castable mixture is cured by heating at a temperature and for a period in the range 120° C. for at least 30 minutes to 160° C. for at least 15 minutes.

6. A method of jointing textile belting or webbing having a moisture content of at least 5% by weight according to claim 1 in which said liquid castable mixture includes at least one material selected from the class consisting of fillers, pigments, flame retardants, plasticisers and stabilisers.

* * * * *